United States Patent
McBrien et al.

(10) Patent No.: US 12,486,822 B2
(45) Date of Patent: Dec. 2, 2025

(54) ENGINE IGNITION SYSTEMS AND CONTROL METHODS THEREFOR

(71) Applicant: Hamilton Sundstrand Corporation, Charlotte, NC (US)

(72) Inventors: Gary McBrien, S. Glastonbury, CT (US); Thomas M. Donahue, Vernon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 165 days.

(21) Appl. No.: 18/077,927

(22) Filed: Dec. 8, 2022

(65) Prior Publication Data

US 2024/0191681 A1    Jun. 13, 2024

(51) Int. Cl.
*F02P 15/00*     (2006.01)
*F02P 3/08*      (2006.01)
*F02P 17/12*     (2006.01)

(52) U.S. Cl.
CPC .......... *F02P 15/003* (2013.01); *F02P 3/0869* (2013.01); *F02P 3/0892* (2013.01); *F02P 17/12* (2013.01); *F02P 2017/121* (2013.01)

(58) Field of Classification Search
CPC ......... F02C 7/26; F02P 3/0807; F02P 3/0815; F02P 3/0838; F02P 3/0846; F02P 3/0861; F02P 3/0869; F02P 3/0884; F02P 3/0892; F02P 15/003; F02P 15/005; F02P 17/12; F02P 17/121
USPC .......................... 123/596, 597; 361/257, 263
See application file for complete search history.

(56) References Cited

U.S. PATENT DOCUMENTS

| | | | |
|---|---|---|---|
| 4,833,369 A |   | 5/1989 | White |
| 5,245,252 A | * | 9/1993 | Frus ................ F02P 9/002 60/776 |
| 5,510,952 A |   | 4/1996 | Bonavia et al. |
| 5,592,118 A | * | 1/1997 | Wilmot .............. H01L 29/74 315/209 T |
| 5,656,966 A | * | 8/1997 | Wilmot .............. H01L 29/74 257/E29.038 |
| 5,936,830 A |   | 8/1999 | Rousseau et al. |
| 6,289,988 B1 |   | 9/2001 | Myers et al. |
| 6,600,322 B1 | * | 7/2003 | Nussbaum ........... F02P 17/12 324/378 |
| 6,670,777 B1 | * | 12/2003 | Petruska ............. F02P 17/12 361/253 |

(Continued)

FOREIGN PATENT DOCUMENTS

| | | |
|---|---|---|
| CA | 2122769 C | 10/2002 |
| CN | 114151260 A | 3/2022 |

(Continued)

OTHER PUBLICATIONS

Partial Search Report dated Mar. 26, 2024, for corresponding European Application No. 23214454.

(Continued)

*Primary Examiner* — Erick R Solis
(74) *Attorney, Agent, or Firm* — Kinney & Lange, P.A.

(57) ABSTRACT

In accordance with at least one aspect of this disclosure, a method can include controlling firing of an exciter of an engine with an electronic controller separate from the exciter as a function of at least one excitation command from the electronic controller and at least one feedback signal from the exciter operatively connected to the electronic controller.

13 Claims, 1 Drawing Sheet

(56) References Cited

U.S. PATENT DOCUMENTS

| | | | |
|---|---|---|---|
| 7,355,300 | B2 | 4/2008 | Wilmot et al. |
| 8,359,869 | B2 | 1/2013 | Wright |
| 8,912,470 | B2 * | 12/2014 | Bauer ................... F02P 19/027 73/114.62 |
| 9,399,954 | B2 | 7/2016 | Wright |
| 9,593,660 | B2 | 3/2017 | Wright |
| 9,915,207 | B2 | 3/2018 | Schaeffer et al. |
| 2021/0087973 | A1 | 3/2021 | Al-Khairy et al. |

FOREIGN PATENT DOCUMENTS

| | | | |
|---|---|---|---|
| EP | 1067622 | A2 | 1/2001 |
| EP | 1607622 | A2 | 12/2005 |
| EP | 4269784 | A2 | 11/2023 |

OTHER PUBLICATIONS

Extended European Search Report for European Patent No. 23214454.3, Dated Jun. 18, 2024, 12 Pages.

\* cited by examiner

ENGINE IGNITION SYSTEMS AND CONTROL METHODS THEREFOR

TECHNICAL FIELD

This disclosure relates to engine ignition systems and control methods therefor.

BACKGROUND

Gas turbine engines require an ignition source to start the combustion process and relight the combustor should the flame go out during operation. The scheme typically is one where a high energy spark is produced that ignites the fuel source. Once commanded to produce sparks, the sparks typically continue at a prescribed rate until a command to stop is issued. In modern architectures there is typically a controller, a power supply, an exciter unit, high tension leads, and igniter plugs.

The controller commands the exciter to deliver energy to the igniters and monitors system health. The power supply provides low voltage AC or DC to power the exciter. The exciter is the ignition spark energy source that converts the low voltage power supply input to a much higher internal voltage, and provides this voltage to charge an energy storage device. The exciter discharges the energy storage device stored energy to the exciter output. Traditionally, the fastest possible charge rate of the energy storage device defines the maximum spark rate. The high tension leads connect the exciter high voltage output via interconnecting wire leads to the igniter plugs, and the igniter plugs create the spark for ignition using the high voltage discharge from the energy storage device.

Such conventional methods and systems have generally been considered satisfactory for their intended purpose. However, there is still a need in the art for improved engine ignition systems. The present disclosure provides a solution for this need.

SUMMARY

In accordance with at least one aspect of this disclosure, a method can include controlling firing of an exciter of an engine with an electronic controller separate from the exciter as a function of at least one excitation command from the electronic controller and at least one feedback signal from an exciter operatively connected to the electronic controller.

In embodiments, at least one excitation command can include a pulse width modulated (PWM) signal from the electronic controller provided to the exciter, and controlling firing of the exciter can further include controlling a firing switch drive to initiate firing of the exciter based at least in part on the PWM signal from the electronic controller. In embodiments, the firing switch can contain a circuit that connects the stored energy to the exciter output but also provides for stepped up higher voltage spikes that may be necessary for the igniter to conduct current (aka sparking).

In embodiments, the method can include, charging the exciter energy storage with energy from electrical power in the exciter and controlling a rate of exciter energy storage charging based at least in part on the feedback signal to modulate the pulse width of the excitation command until a predetermined charge threshold voltage is reached. In embodiments, the predetermined charge voltage can be set based on a voltage level required to light the engine with the igniter. In certain embodiments, the predetermined charge threshold can be selected based on one or more engine conditions and/or one or more environmental conditions.

In embodiments, the method can include monitoring a state of the engine and adjusting the predetermined charge threshold based at least in part on the state of the engine.

In embodiments, controlling the exciter (e.g., controlling a magnitude and frequency of energy supplied to the igniter) can further include controlling firing of a firing switch, via the firing switch driver, as a function of the predetermined charge threshold voltage and automatically firing the firing switch when the predetermined charge threshold is reached.

In embodiments, controlling the exciter can further include independently controlling the firing switch driver to control firing of a firing switch as a function of the PWM signal and the feedback signal irrespective of whether the predetermined charge threshold is reached.

In embodiments, controlling the exciter can further include controlling a sparking period of the exciter using a ramp control. In certain embodiments, controlling the exciter can further include controlling the firing switch driver to control firing of a firing switch as a function of the predetermined charge threshold voltage and automatically firing the firing switch when the predetermined charge threshold is reached. In certain embodiments, the method can further include monitoring, using the feedback signal, the voltage threshold at which the firing switch fired and varying the ramp control as a function of the voltage threshold at which the fired switch fired to tune the predetermined voltage threshold at which the firing switch fires over time.

In certain embodiments, the ramp control can include controlling an interval between initiating sparks and terminating sparks, and also controlling the rate of sparking over the interval such that controlling the exciter includes controlling the sparking period, the rate of sparking, and a number of sparks over the interval. In certain embodiments, the method can further include controlling, with a timing module, a start time of charging the exciter energy storage and a total charge time of the exciter energy storage to control the rate of sparking.

In accordance with at least one aspect of this disclosure, a method can include monitoring a charge voltage threshold of an energy storage of an exciter necessary to fire an igniter to light an engine over time and determining a health status of one or more engine components based at least in part on the charge voltage threshold of the energy storage.

In embodiments, the method can further include monitoring and/or counting a number of successful discharges of the energy storage, storing data relating to the monitoring and/or counting of the successful discharges in a memory, and determining the health status of the one or more engine components based on a total number of successful discharges. In certain embodiments, monitoring can include monitoring at an interval of about 100 to about 1000 times per second. In embodiments, the method can further include isolating a high tension lead and the igniter from a charge voltage in the energy storage and evaluating a dielectric withstand threshold within the exciter to test a dielectric capability of one or more components of the exciter (e.g., the internal exciter circuitry).

In accordance with at least one aspect of this disclosure, a non-transitory computer readable medium can include computer executable instructions, the computer executable instructions configured to cause a computer to perform a method. In embodiments, the method can include controlling an exciter of an engine with an electronic controller separate from the exciter as a function of at least one excitation command from the electronic controller and a feedback signal from the exciter operatively connected to the electronic controller.

In embodiments, the at least one excitation command includes a pulse width modulated (PWM) signal from the electronic controller provided to the exciter, and controlling the exciter can further include controlling a firing switch of the exciter based at least in part on the PWM signal from the electronic controller. In embodiments, the method can further include charging the exciter energy storage with energy from electrical power in the exciter, and controlling a rate of exciter energy storage charging based at least in part on the feedback signal to modulate the pulse width of the at least one excitation command until a predetermined charge threshold voltage is reached. In embodiments, the predetermined charge threshold voltage is selected based on one or more engine conditions and/or one or more environmental conditions.

In embodiments, the method can include monitoring and/or counting a number of successful discharges of the exciter energy storage, storing data relating to the monitoring and/or counting of the successful discharges in a memory, and determining the health status of the one or more engine components based on a total number of successful discharges.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to FIG. 1, wherein.

DETAILED DESCRIPTION

Reference will now be made to the drawing wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

Figure 1:
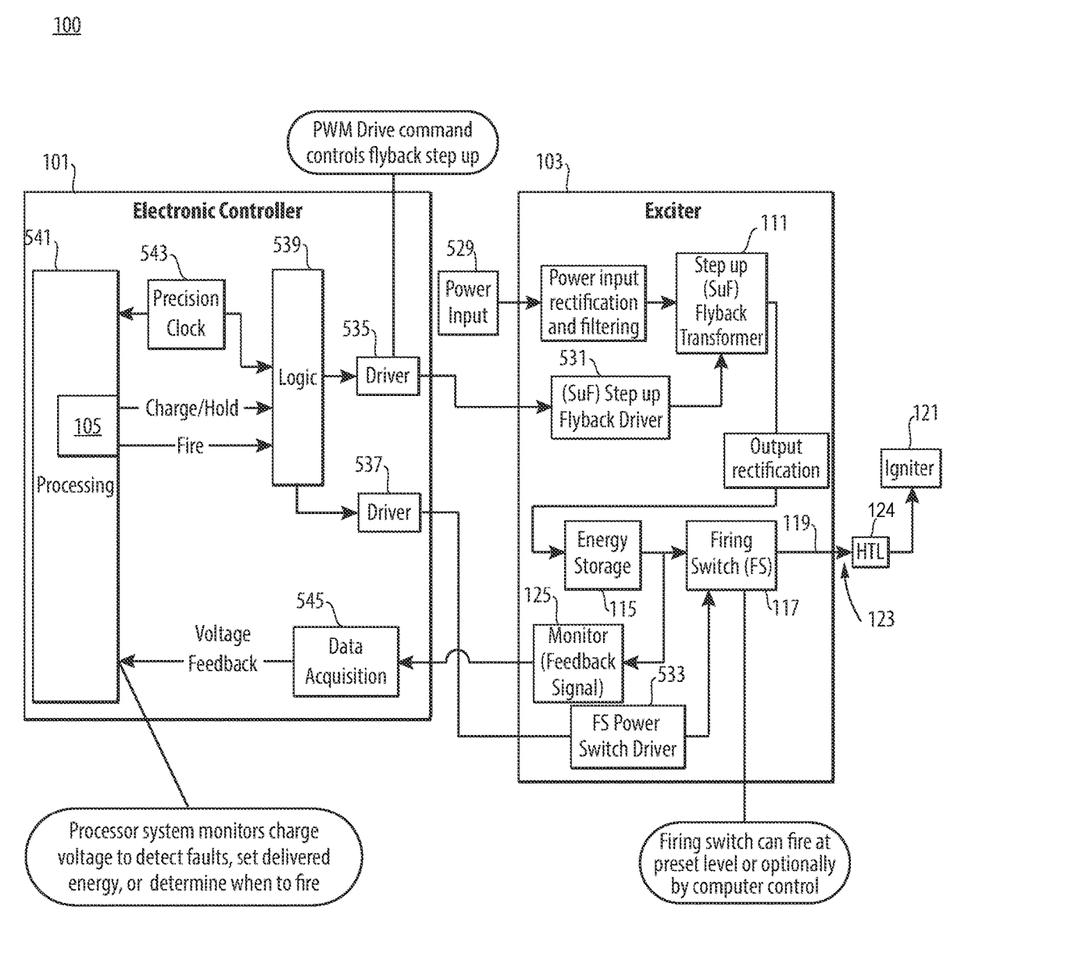
FIG. 1 is a schematic circuit diagram of an embodiment of a system and method in accordance with this disclosure.

Referring to FIG. 1, an engine ignition system 100 can include a multifunction controller 101, and an exciter 103 operatively connected to the multifunction controller 101. The multifunction controller 101 can be configured to control the exciter 103 to output an ignition voltage. The multifunction controller 101 can be configured to perform at least one other engine control function (e.g., engine speed in response to throttle commands, for example). Any suitable other engine control function is contemplated herein.

In certain embodiments, the multifunction controller 101 can include an ignition switch mode control module 105. The multifunction controller 101 can be a FADEC (full authority digital engine controller), for example (e.g., having the mode control module added thereto). Hardware that already exists on the FADEC can be utilized to the maximum extent to integrate the mode control module 105 and/or any other suitable control function, thereby reducing weight and component count of the overall system.

In certain embodiments, the exciter 103 can include an energy storage device 115, and a firing switch 117 connected between the energy storage device 115 and an igniter output 119. In certain embodiments, the firing switch 117 can be configured to be controlled by the multifunction controller 101. However, in certain embodiments, the firing switch 117 can be configured to automatically close when the charge on the energy storage device 115 reaches an ignition threshold without control from the controller 101.

The exciter 103 can include a step-up transformer 111 connected between a power supply input 529 and the energy storage device 115. The exciter 103 can include a monitor 123 connected to the energy storage device 115 to monitor a state of the energy storage device 115. The monitor 123 can be connected to the multifunction controller 101 to provide data to the multifunction controller 101.

In certain embodiments, the exciter 103 can include a step up driver 531 operatively connected to the step up transformer 111 to control the step up transformer 111. The step up driver 531 can be controlled by the mode control module 105.

In certain embodiments, the exciter 103 can include a power switch driver 533 operatively connected to the firing switch 117 to control the firing switch 117. In certain embodiments, the power switch driver 533 can be controlled by the mode control module 105.

In certain embodiments, the multifunction controller 101 can include a first driver 535 and a second driver 537 connected to and controlled by a logic block 539. The logic block 539 can be connected to a processing module 541 that includes the mode control module 105 (or a portion thereof), for example. The step up transformer Flyback driver 531 can be controlled by the mode control module 105 via the first driver 535 through the logic block 539 based on commands from the processing module 541. The power switch driver 533 can be controlled by the mode control module 105 via the second driver 537 through the logic block 539 based on commands from the processing module 541.

The multifunction controller 101 can include a precision clock 543 operatively connected to the logic 539 and/or the processing module 541. The multifunction controller 101 can include a data acquisition module 545 operatively connected to the monitor 125 of the exciter 103.

While FIG. 1 shows an embodiment of a disambiguation of a system 100, any other suitable disambiguation of components to reduce overall size, weight, and/or part count of the controller 101 and exciter 103 is contemplated herein. For example, the multifunction controller 101 may only require the addition of a physical logic block 539 and/or the drivers 535 and 537. All other components may already exist in the controller 101 (e.g., the clock 543 and data acquisition module 545) depending on the other functions handled by the controller 101 (e.g., which can be a FADEC), and many software functions can be hosted on common hardware.

In accordance with at least one aspect of this disclosure, a method can include controlling an exciter 103 of an engine with an electronic controller (e.g., multifunction controller 101) separate from the exciter as a function of at least one excitation command from the electronic controller and at least one feedback signal from the exciter (e.g., exciter 103) operatively connected to the electronic controller.

In embodiments, the at least one excitation command can include a pulse width modulated (PWM) signal from the electronic controller provided to the exciter, and controlling the exciter can further include controlling a firing switch driver (e.g., driver 533), to control a firing switch (e.g., firing switch 117) of the exciter based at least in part on the PWM signal from the electronic controller.

The method can include charging the exciter energy storage (e.g., energy storage device 115) with energy from electrical power (e.g., derived from power input 529 and stored in energy storage 115) in the exciter and controlling a rate of exciter energy storage 115 charging based at least in part on the feedback signal 125 to modulate the pulse width of the excitation command until a predetermined exciter energy storage 115 charge threshold voltage is reached. In embodiments, the exciter energy storage 115 charge time can be varied, for example by varying the PWM signal. When the spark rate is low enough, the charging can be slowed by using a narrower PWM signal so that the amount of current drawn from the supply stays within an acceptable level. In embodiments, the exciter can include firing switch circuitry, the circuitry including the firing switch driver, which can be controlled by the controller to initiate a firing of the exciter at a specified moment in time. The circuitry can include the firing switch, the firing switch having, at least a means to connect the exciter energy storage to the exciter output; and a means to step up the voltage if required to initiate a spark across the igniter tip.

In embodiments, the predetermined charge voltage can be set based on a minimum voltage level (e.g., a voltage level required to supply sufficient energy) to light the engine with the igniter. In certain embodiments, the minimum voltage level can be a voltage level required to light the engine with the igniter but without exceeding the voltage necessary to light the engine, for example in embodiments that have independent output control and/or embodiments that include enough firing margin to allow an automatically triggered system to fire the output. In embodiments, the exciter energy storage 115 can be charged to a specific voltage using the feedback signal to keep the charging voltage within a certain maximum. If this maximum is below the dielectric withstand voltage of the system, the charged voltage should not leak down more than a certain rate when the charge voltage starts below a certain maximum.

In certain embodiments, the predetermined charge threshold can be selected based on one or more engine conditions and/or one or more environmental conditions, for example on a hot day with hot fuel the energy required to start the engine could be less than is necessary than what is required on a cold day with cold fuel, thus for a hot day with hot fuel, the predetermined charge threshold may be lower than a cold day with cold fuel.

In embodiments, the method can include monitoring a state of the engine with the electronic controller 101 and adjusting the predetermined charge threshold voltage based at least in part on the state of the engine. For example, the method can include monitoring whether the igniter spark was successful in lighting the engine, and if not, the method can include adjusting the predetermined charge threshold voltage and/or spark rate until the spark is successful in lighting the engine. For example, adjusting can include incrementally raising the charge threshold voltage and/or incrementally increasing the igniter sparking rate until the spark is successful. In embodiments, the initial charge threshold voltage can start low, and increase until a successful engine light is obtained.

In embodiments, controlling the exciter can further include controlling the firing switch driver to control firing of the firing switch as a function of the predetermined charge threshold and automatically firing the firing switch when the predetermined charge threshold is reached.

In embodiments, controlling the exciter can further include independently controlling the firing switch driver to control firing of the firing switch as a function of the PWM signal and the feedback signal irrespective of whether the predetermined charge threshold is reached. For example, the controller can be configured to control the driver 533 to fire the firing switch 117 regardless of the charge level of the exciter energy storage 115.

In embodiments, controlling the exciter can further include controlling a sparking period of the igniter using a ramp control. In certain embodiments, the method can further include monitoring, using the feedback signal, the voltage threshold at which the firing switch fired and varying the ramp control as a function of the voltage threshold at which the firing switch fired to tune the predetermined voltage threshold at which the firing switch fires over time.

In certain embodiments, the ramp control can include controlling an interval between initiating sparks and terminating sparks, and controlling the rate of sparking over the interval also such that controlling the exciter includes controlling the sparking period, the rate of sparking, and a number of sparks over the interval. In certain embodiments, the method can further include controlling, with a timing module (e.g., clock 543), a start time of charging the exciter energy storage and a total charge time of the exciter energy storage 115 to control the rate of sparking. Here, the spark rate can be precisely controlled and can be infinitely variable by spacing the time between charge initiations, from spark rates that are very slow to spark rates that are very fast. For example, the spark can vary from very slow (e.g., one spark every two seconds) to very fast (e.g., 50 sparks every second).

In accordance with at least one aspect of this disclosure, a method (e.g., a built-in-test method) can include monitoring a charge voltage threshold of an energy storage (e.g., energy storage device 115) of an exciter (e.g., exciter 103) necessary to fire an igniter (e.g., igniter 121) to light an engine, over time, and determining a health status of one or more engine components based at least in part on the charge voltage threshold of the energy storage. In embodiments, the one or more engine components can include a fuel nozzle and the health status can include information relating to plugging or sticking. In certain embodiments, the one or more engine components can include a combustor and the health status can include information regarding wear that can affect the inlet air path.

In embodiments, the method can further include monitoring and/or counting a number of successful discharges of the energy storage, storing data relating to the monitoring and/or counting of the successful discharges in a memory, and determining the health status of the one or more engine components based on a total number of successful discharges. In cases where the exciter fires automatically upon reaching a certain predetermined charge voltage level, the monitoring feedback can be used to monitor the actual firing point. This can be used to monitor exciter health and can be used to record aggregate system wear, such as wear of the igniter tip.

In certain embodiments, monitoring can include monitoring at an interval of about 100 to about 1000 times per second. In certain embodiments, the monitoring interval can be about 100 seconds to about 300 seconds. In embodiments, the method can further include isolating a high tension lead (e.g., lead 124) and the igniter from a charge voltage of the energy storage device and evaluating a dielectric withstand threshold within the exciter to test a dielectric capability of one or more components of the exciter (e.g., the internal circuitry of the exciter).

In accordance with at least one aspect of this disclosure, a non-transitory computer readable medium can include computer executable instructions, the computer executable instructions configured to cause a computer to perform a method. In embodiments, the method can include any one or more of the methods provided herein.

Embodiments can include an architecture that provides the opportunity for the vast computing power and other resources of the existing controller (e.g., an existing FADEC) to be used for ignition functions, as well as provide new capability that combined can result in a more advanced ignition system, without requiring additional controllers or hardware to be added to the existing controller and/or exciter.

Embodiments of the methods provided herein allow for the control of the exciter with at least one command signal and a feedback signal without the need for any dedicated hardware in the exciter. Embodiments therefor allow for commanding sparking to be initiated, for commanding sparking to be stopped, for a selectable charge time of the exciter internal energy storage device, for controlling the characteristics of the input current into the exciter (average, peak, etc.), for precise timing of the spark rate, for infinitely variable spark rates between set limits, and for varying the peak stored energy based on required conditions in conjunction with the feedback signal.

Embodiments also allow the controller and control methods to function in a built-in test mode where varying voltages can be applied to the high tension lead and igniter to detect shorts or dielectric shortfalls in the system. In embodiments where there may be multiple outputs powered from a common power supply, embodiments allow for charging any combination of possible outputs (effectively selecting the output to be activated) without any addition of selection mechanisms. Embodiments can provide the ability for the exciter to shunt excess power to ground when the input is a high voltage high impedance power source such as a permanent magnet alternator (PMA).

In embodiments, the controller driver 535 can be a pulse width modulated (PWM) signal. The controller PWM signal can control the Step up Flyback Driver in the exciter, and the Step up Flyback can use energy from the electrical power in the exciter to apply pulses of energy that are rectified and stored in the exciter energy storage device. The controller can use the feedback from the exciter to change the PWM pulse width as needed to vary the rate of charging and the ultimate charge/voltage level in energy storage 115. When a suitable amount of energy is stored, the controller can turn off the PWM. The duration of the sparking period can be controlled by controlling the interval between initiating sparks and terminating sparks.

In embodiments, the rate of sparks can be controlled over the interval also such that spark period, spark rate, and number of sparks over the interval can be controlled. In embodiments, by monitoring successful discharges, the number of sparks delivered can be counted if necessary. This can be used to maintain in memory a total number of sparks delivered over the time the igniter or exciter is installed on the engine.

In embodiments, by varying the PWM, the charge time can be varied. The feedback can be monitored which can indicate the charge rate for a given PWM. Using that relationship, the PWM can be varied to change the charge rate. Alternatively, in embodiments, a desired ramp rate for the energy can be created in the controller, and the PWM can be altered using a proportional-integral-derivative (PID) control scheme to make the actual ramp rate of the stored energy match the desired ramp rate. After applying one or several pulses, the increase in energy storage 115 voltage can be used in a predictive manner to determine the width of future pulses. This can be useful in embodiments where the stored energy automatically triggers the firing switch when the charge threshold is reached. In embodiments, the controller can monitor the feedback at frequent intervals, for example as often as 100 to 1000 times per second. In embodiments in which the exciter firing switch fires automatically upon reaching the charge threshold, the feedback can be used to monitor the actual firing point. This can be used for exciter and/or firing switch health monitoring, and can be used to record aggregate system wear, such as wear of the igniter tip. Further, in such embodiments, using the feedback signal to measure the point at which the system fires can be used to vary the ramp rate so that the system can fire at the desired point in time more accurately. Additionally, to provide a more precise firing point, the ramp rate near the point of firing can be ramped up at a high rate so that it will fire within a narrow window of time.

In embodiments, by varying the PWM, the charge time can be varied. When the spark rate is low enough, the charging rate can be slowed by using a narrower PWM so that the amount of current drawn from the power supply stays within an acceptable level. In embodiments, the desired spark rate can be slower than the maximum rate possible. Using the precise time base of the controller, the initiation of charging can start at a precise time. In embodiments, the charge time can also be controlled. Using the precise control of the charge time, combined with the precise control of the points in time when charging is initiated, the rate of spark firing can be controlled very precisely.

Embodiments may or may not include an independent output stage, and in certain embodiments, there may not be any need for quenching resistors to dissipate energy when the igniter is quenched and does not spark and dissipate the energy. If the output is fired independently (e.g., independent of the charge threshold), it may not be necessary to discharge the stored energy in order to attempt another firing. If an attempted spark is made and the stored energy voltage does not drop abruptly, the output stage can be fired quickly and repeatedly as necessary until a spark occurs. At that point charging can resume as necessary.

Embodiments can have an infinitely variable spark rate. For example, in embodiments, the spark rate can vary from a very slow rate to the fastest rate possible and can be precisely controlled and infinitely variable by spacing the time between charge initiations.

Embodiments can have variable stored energy. For example, the feedback signal can be used with the PWM to charge the energy storage to a specific point. In embodiments, the stored energy (charge threshold) can be selected based on what is needed to light the engine while not providing any more energy than necessary (e.g., in embodiments that have independent output control or embodiments where there is enough firing margin to allow an automatically triggered system to fire the switch). In certain embodiments the stored energy level and charge threshold can be selected based on engine conditions, for example on a hot day with hot fuel the energy required could be less than what is required on a cold day with cold fuel. In certain embodiments, the charge threshold can initially start out at a low energy level and be quickly increased if the lower levels fail to start the engine.

In embodiments, by monitoring the level of stored energy necessary to light the engine (e.g., monitoring the charge level at which the switch is fired), this may also provide indications of fuel nozzle health, such as plugging or sticking, or combustor health problems such as wear that affects the inlet air path, for example.

In embodiments, the energy storage can be charged to a specific voltage using the feedback signal to keep the charging voltage within a certain limit. If this is below the dielectric withstand voltage of the system, the charged voltage should not leak down more than a certain rate when the charge voltage stays below a certain level. In embodiments wherein the firing is controlled by an independent output stage, the charge can be kept at a certain value that is less than the maximum, and the igniter can be fired at that level. If an output spark cannot be created, the stored energy level can be raised. If the engine does not light off at lower levels of energy, the stored energy can be incrementally raised until the engine lights off. If the maximum energy level is reached and the engine still does not light, a fault can be reported along with the recent history of charge levels and number of start attempts at each energy level.

Embodiments can have a variable output amplitude. In embodiments having an independent, controllable output stage, the variable output amplitude can be used to initiate spark firing at various different energy levels, and also the voltage level of the output stage can be varied as well.

In embodiments, the output stage may isolate the high tension lead and the igniter from the charge voltage. Here, the charge voltage can be used to evaluate dielectric withstand inside the exciter but not beyond the output stage. If the output stage can be activated to various levels, it can be used to test the dielectric capability of the high tension lead and exciter.

Embodiments can include Built-in Test (BIT) modes. In embodiments, a BIT mode can include a dielectric test. Using the PWM and feedback, if the charge voltage in the energy storage is held under the maximum dielectric withstand voltage for the exciter and output components high tension leads and igniters with the firing switch closed, then once charged, the feedback can be monitored to see if the output voltage is draining down over time at a rate that indicates the components are not meeting the dielectric requirements. This could indicate cracked or dirty components, a non-hermetic exciter or fouled igniters.

In embodiments, a BIT mode can include testing the charge rate. In embodiments, the charge rate can be monitored against a stored standard charge rate, which can be different for different operating conditions. If for a given PWM the charge rate is not as expected, it could indicate a potential problem with the power to the exciter or the exciter charge circuit itself. In embodiments, if there are multiple charging circuits within the exciter that use a common power supply, the health of each circuit can be checked independently. If one charging circuit is not charging at the right rate, but the others are, this indicates an issue in this specific circuit in the exciter. If all circuits indicate a problem, this indicates an issue in the power supply.

In embodiments, BIT mode can include testing successful sparks. In embodiments, the charge voltage can be monitored, and the system can monitor for successful sparks delivered. Depending on the quenching scheme, embodiments can include monitoring the feedback to determine whether there was a fast discharge (spark), or a slow discharge (quench) or no discharge (quench with no quench resistor in system).

Embodiments can be configured to control multiple outputs. In embodiments, several ignition circuits can be connected in parallel. The controller can be configured to control the outputs to be operated in a coordinated fashion so that they do not create excessive current draw (ex., alternating energy storage charging on multiple circuits). In embodiments, coordinated output operation can also level the peaks of exciter input current, to reduce conducted emissions.

Embodiments can be configured to shunt excess current. For example, for certain power supplies the output voltage will rise too high if the load (in this case the exciter) does not provide a minimum electrical loading. Embodiments can provide a minimum load mode that will prevent the input power supply voltage from rising too high.

Embodiments provide improved functionality over traditional systems and methods. In embodiments, the spark control accuracy is improved and provides precise control over the firing switch. The controller can include a time-base control that can be at least +/−0.1% accurate. The improved control scheme as provided herein can also provide accurate and precise control over the charge rate of the energy storage, the firing rate of the firing switch, and therefore the spark rate.

In embodiments, the controller can be configured to precisely control the charge rate so that the exciter can charge at the highest rate possible, while preventing charging from taking place too fast, which could produce input currents to the exciter that are higher than allowed by the hardware of a given exciter. In embodiments, having precise control over spark rate and charge rate can allow the charging to take place such that there is consistently time for the system to charge the energy storage to the required value, even at the highest firing rate.

In embodiments, the controller can be configured to precisely control the firing rate. A firing rate that is too high can accelerate the wear of the exciter, igniter and high tension leads, while a firing rate that is too low may compromise the ability to cause an engine light. The controller and methods provided herein provide for a precise firing rate which allows for the rate to be high enough to consistently light the engine while producing no "extra" sparks that can cause wear and aging.

In embodiments, the controller can be configured to precisely control the spark rate. In embodiments, the spark rate can be controlled over an infinite range of selections within defined limits. This can allow tailoring the spark rate to the operating conditions which provides a sufficient spark rate for the operating condition while not creating more than the required amount of sparking, thus extending exciter, high tension lead and igniter life. In embodiments, the variable energy levels can also allow tailoring the spark to specific situations so that exciter, high tension leads and igniter will have maximum life.

In certain embodiments, by varying the charge threshold based on engine or environmental condition, e.g., allowing higher energy levels on cold days and cold fuel, and lower energy levels on hot days and hot fuel, can act to mitigate wear on the exciter, high tension lead and igniter. For example, if the charge threshold was set at a constant level based on a cold fuel, cold air day, the large amounts of power that are used with cold fuel and cold days, the high threshold on a hot fuel, hot air day would input much more energy than required for the given conditions, wearing the exciter, high tension leads and igniter much quicker. The variable charge threshold therefore allows for setting the threshold based on, at least, the current conditions of the fuel, engine, and environment.

Embodiments can provide a method for built-in test, fault detection, and fault isolation. In certain embodiments, the system can be configured to verify charging, for example, the charge time can be monitored and the ability to reach full voltage can be checked.

In embodiments, the system can be configured to have a variable charge voltage. For example, the variable charge voltage can create a voltage that is lower than the dielectric withstand voltage of the components, but high enough to provide a test of the dielectric. In embodiments, therefore, the system can be tested to show that energy is not lost, which, if left unchecked, could create a condition that results in less spark energy.

In embodiments, the system can be configured to have a variable output voltage. In certain embodiments, e.g., where the stored energy is not presented at the output or sufficient to fully test the output, the output stage can be triggered at levels to provide the dielectric testing.

In embodiments, the system can be configured to perform a firing check. For example, if the system does not fire, the system can monitor the output voltage. If the output voltage does not drop, it could indicate that firing was unsuccessful. In embodiments, the rate of discharge can also be monitored to determine a successful firing, for example if the discharge rate is much too slow compared to an expected discharge rate, this could also indicate an unsuccessful firing.

In embodiments, the system can be configured to monitor quenching. Embodiments may not require certain quenching resistors, however, high value resistors can be used if needed to bleed off stored charge for engine maintenance personnel safety purposes. In embodiments, the system can be configured to distinguish a quenched condition (e.g., igniter gap unable to fire) having a slow discharge rate, from a true spark. Embodiments can also be configured to detect and overcome a fouled igniter condition, which could exhibit a slow discharge, by monitoring the firing rate and adjusting the firing rate accordingly.

Embodiments can shift hardware locations and functions in a way that allows each component to exist in an acceptable thermal environment, while also realizing a weight and part count decrease. Certain modern controllers (e.g., FADECs) having excess computing power can handle added functions without compromising functionality or speed. Embodiments require less circuitry (size, part count, and/or weight) than even the simplest of traditional systems. For example, traditional mode control hardware required 6 square inches of space, but if this functionality is integrated into the multifunction controller, this allows it to be much smaller, e.g., less than 1 square inch of added hardware. In certain embodiments, the only thing physically added to the controller hardware can be the ignition switch mode control module (e.g., a PWM driver and/or related components). Embodiments of a mode control module can be directly connected to the ignition step up drivers and provide a PWM signal to the step up driver.

Certain embodiments can move the step up flyback driver to the controller, can have power wired to a high frequency power drive, and/or can have exciter input power routed through the controller. Utilizing embodiments, high voltage control can be directly commanded by the FADEC of the engine.

In certain embodiments of a system, functionality that already resides in the multifunction controller can be leveraged to provide the capability that the more modern exciter needs. The controller can already have extensive input filtering, internal power supplies, computational resources, thermal management, circuit board assemblies for packaging the circuits, and vibration isolation. The controller can be a highly sophisticated electronic unit that incorporates a tremendously capable computer, memory, and a multitude of different input and output types, such as sensor interfaces and effector drivers. A simple on/off command to the exciter can be replaced with a switch mode supply command, and the simple health feedback circuit can be replaced with more precise voltage feedback. By using resources that already reside inside the controller, those functions can be eliminated from the exciter and replaced by more capable hardware in the controller. Using this more-integrated approach, embodiments can provide the robust capability of the older technology, especially temperature and vibration capability, and also provide the advantages of more modern technology.

The controller in embodiments can provide a suitable high frequency drive signal to directly drive the ignition step up flyback driver in the exciter. The high frequency step up transformer in the exciter can be for example in one embodiment a flyback type transformer. A transistor switch in the exciter can be used as the ignition step up driver. In certain applications, the switch frequency could be as low as 25 kHz, or much higher, for example as high as 100 kHz or more. A lower frequency can minimize EMI concerns and reduce the switching device power dissipation, whereas a higher frequency allows for smaller magnetics and filter components. Feedback from the exciter provided to the controller can show the value of stored internal charge within the exciter. When firing is desired, the controller can provide a SM (Switch Mode) signal to the exciter, causing the ignition driver to cycle "in step" with the input signal, thereby switching the flyback transformer, which, over time, charges up the exciter internal energy storage device at a desired rate. When the energy storage voltage reaches a target threshold, the firing switch in the exciter can apply the stored energy to the output of the exciter, resulting in a spark at the igniter plug.

The firing switch can take on any suitable forms. It can be a gas discharge tube, a solid state switch, for example, or any other suitable firing switch. The switch can be set up to fire at a preset voltage or it could be set up to fire based on a command from the controller.

Using the combination of monitoring the charge voltage (and therefore stored energy), as well as a coordinated activation of the firing switch, a range of functionality can be accomplished. In cases where the firing switch does not isolate the output, the charged voltage can be monitored for a decay when not charging, which can indicate that the dielectric withstand capability of the high tension lead or igniter has been compromised. Or if the firing switch does isolate, the exciter can also be operated in a way that it attempts to fire at lower voltages than the minimum withstand capability of the igniter, to detect faults in the high tension leads and igniters such as dirty or cracked insulation or loss of exciter hermeticity in cases where the exciter relies on a sealed gaseous environment in the enclosure for dielectric isolation. If there is a discharge of energy at a voltage lower than the required minimum, it can indicate there is a problem in the system.

The controller can vary the pulse width of the driver frequency as necessary to charge the system. A lower pulse width produces a slower charge rate but lower current draw from the main supply. A wider pulse width will allow the system to be charged more quickly. The charge time can be tailored for the input power supply capability and also it can be made long enough to allow for frequent sampling by the feedback circuits which are used by the controller to monitor the system.

Based on the desired firing rate, after waiting a suitable precise amount of time, the controller can again start the switch sequence, causing another charge-discharge cycle to occur. This sequence can be repeated as necessary until the time duration required for the spark sequence is complete.

Historically the ignition function has been provided with hardware that is fairly independent of the control system. Past engine controls have been hydromechanical or simple electronic devices that have provided a simple on/off command to the exciter module. The command may be provided by a simple pilot activated switch.

In some cases the ignition command is provided continuously after engine start, relying on the pressure of the running engine to quench (or shut off) spark production when it is not needed. High tension systems (for example greater than 12,000V peak output pulse), have spark plug designs that auto-quench at high combustor pressure so they don't continue to spark once the engine is fully running.

Low tension systems (less than the typical 12,000V peak pulse voltage of high tension systems) have spark plug designs that will not auto-quench, and unless commanded off will continue to spark regardless of engine operating condition.

In either case the systems share a common feature which is to raise a low voltage input supply to a high voltage that is the basis for the energy stored in the exciter, and upon receiving the command to produce sparks the exciter provides the rest of the functionality independently until commanded to turn off.

As the controllers have become more and more sophisticated over time, the ignition systems have continued to remain largely independent and self-contained relative to the controller.

Older systems exhibit limited sophistication and use older technology components to perform the internal functions. Systems have used either low frequency voltage step up transformers connected to AC supplies, or simple relaxation (chopper relay) oscillators that produce an AC excitation from a DC voltage supply to produce the necessary high voltage. These high voltages are in turn rectified and applied to a storage element, where the voltage increases until the discharge element is triggered, at which case the energy is presented to the output for transmission to the igniter.

One benefit of the older technology is that the components are simple and are available in relatively high temperature capability which is necessary for the equipment to survive in the high temperature environment that is present where the exciters are mounted on the engine.

Older systems can use components that have been around for many years, which can form a simple system, but the components may be large and heavy, and in some cases prone to obsolescence or procurement issues. These work with either AC supplies, or simple chopper type DC supplies.

More modern systems can take advantage of smaller, lighter components. In addition, functions such as the firing switch driver 533 and firing switch 117 circuitry can be upgraded to more modern devices. These can run at a higher frequency which allows for smaller magnetic components in the switching circuitry, and this frequency is generated internally within the controller 101 with various internal power supplies and control circuits. The additional functions are contained in block 533 in FIG. 1. Although the system now can use smaller lighter components and can have better monitoring capability, there is an additional burden of requiring the extra power, control, and driver circuits shown. In addition to the added space and weight of these functions, there is also the additional complication of these circuits requiring functionality provided by integrated circuits, which in standard electronics devices made available in industry have a more limited temperature range than the typical exciter installation requires. These components also are more susceptible to the high vibration environment present in the exciter.

Embodiments include a more optimally integrated approach between the controller and the exciter to provide weight savings, increased reliability, more flexible capability, enhanced functions, and higher temperature capability of the exciter.

Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A method, comprising:
controlling firing of an exciter of an engine with an electronic controller separate from the exciter as a function of at least one excitation command from the electronic controller and at least one feedback signal from the exciter operatively connected to the electronic controller, wherein the at least one excitation command includes a pulse width modulated (PWM) signal from the electronic controller provided to the exciter;
charging the exciter energy storage with energy from electrical power in the exciter; and
controlling a rate of exciter energy storage charging based at least in part on the feedback signal to modulate the pulse width of the excitation command until a predetermined charge threshold voltage is reached;
monitoring a state of the engine including a minimum voltage level to light the engine with an ignitor; and adjusting the predetermined charge threshold voltage based at least in part on the minimum voltage level to light the engine and one or more environmental conditions.

2. The method of claim 1,
wherein firing of the igniter further includes:
controlling a firing switch driver to initiate firing of the exciter based at least in part on the PWM signal from the electronic controller.

3. The method of claim 1, wherein controlling the exciter further includes controlling the firing switch driver to control firing of a firing switch as a function of the predetermined charge threshold voltage and automatically firing the firing switch when the predetermined charge threshold voltage is reached.

4. The method of claim 1, wherein controlling the exciter further includes independently controlling the firing switch driver to control firing of a firing switch as a function of the PWM signal and the feedback signal irrespective of whether the predetermined charge threshold voltage is reached.

5. The method of claim 1, wherein controlling the exciter further includes controlling a sparking period of the igniter using a ramp control.

6. The method of claim 5, wherein controlling the exciter further includes controlling the firing switch driver to control firing of a firing switch as a function of the predetermined charge threshold voltage and automatically firing the firing switch when the predetermined charge threshold is reached, and further comprising:
monitoring, using the feedback signal, the voltage threshold at which the firing switch fired; and
varying the ramp control as a function of the voltage threshold at which the firing switch fired to tune the predetermined voltage threshold at which the firing switch fires over time.

7. The method of claim 5, wherein the ramp control includes, controlling an interval between initiating sparks and terminating sparks, and controlling the rate of sparking over the interval also such that controlling the exciter includes controlling the sparking period, the rate of sparking, and a number of sparks over the interval.

8. The method of claim 7, further comprising, controlling, with a timing module, a start time of charging the exciter energy storage and a total charge time of the exciter energy storage to control the rate of sparking.

9. A method, comprising:
monitoring a charge voltage threshold of an energy storage of an exciter necessary to fire an igniter to light an engine over time; and
determining a health status of one or more engine components based at least in part on the charge voltage threshold of the energy storage;
monitoring and/or counting a number of successful discharges of the energy storage; storing data relating to the monitoring and/or counting of the successful discharges in a memory; and
determining the health status of the one or more engine components based on a total number of successful discharges.

10. The method of claim 9, wherein monitoring includes, monitoring at an interval of about 100 to about 1000 times per second.

11. The method of claim 9, further comprising isolating a high tension lead and the igniter from a charge voltage in the energy storage; and
evaluating a dielectric withstand threshold within the exciter to test a dielectric capability of one or more components of the exciter.

12. A non-transitory computer readable medium having computer executable instructions, the computer executable instructions configured to cause a computer to perform a method, the method comprising:
controlling an exciter of an engine with an electronic controller separate from the exciter as a function of at least one excitation command from the electronic controller and a feedback signal from the exciter operatively connected to the electronic controller, wherein the at least one excitation command includes a pulse width modulated (PWM) signal from the electronic controller provided to the exciter;
charging the exciter energy storage with energy from electrical power in the exciter; and
controlling a rate of exciter energy storage charging based at least in part on the feedback signal to modulate the pulse width of the excitation command until a predetermined charge threshold voltage is reached;
monitoring a state of the engine including a minimum voltage level to light the engine with an igniter; and
adjusting the predetermined charge threshold voltage based at least in part on the minimum voltage level to light the engine and one or more environmental conditions.

13. The medium of claim 12, further comprising:
monitoring and/or counting a number of successful discharges of the exciter energy storage;
storing data relating to the monitoring and/or counting of the successful discharges in a memory; and
determining the health status of the one or more engine components based on a total number of successful discharges.

* * * * *